United States Patent [19]
Otsuki

[11] Patent Number: 5,051,774
[45] Date of Patent: Sep. 24, 1991

[54] MICROFILM CAMERA

[75] Inventor: Hajime Otsuki, Osaka, Japan

[73] Assignee: Minolta Camera Kabushiki Kaisha, Osaka, Japan

[21] Appl. No.: 590,332

[22] Filed: Sep. 28, 1990

Related U.S. Application Data

[63] Continuation of Ser. No. 318,236, Mar. 3, 1989, abandoned.

[30] Foreign Application Priority Data

Mar. 4, 1988 [JP] Japan .................................. 63-50734
Mar. 4, 1988 [JP] Japan .................................. 63-50735
Mar. 4, 1988 [JP] Japan .................................. 63-50736

[51] Int. Cl.[5] ...................... G03B 27/32; G03B 27/52
[52] U.S. Cl. ........................................ 355/64; 355/40
[58] Field of Search ....................... 355/64, 65, 40, 41, 355/42, 43

[56] References Cited

U.S. PATENT DOCUMENTS 4,148,579  4/1979  Axelrod et al. ..................... 355/64
4,783,686  11/1988 Ishii et al. ........................... 355/64

FOREIGN PATENT DOCUMENTS 164730 10/1982 Japan .

Primary Examiner—W. B. Perkey
Assistant Examiner—Cassandra C. Spyrou
Attorney, Agent, or Firm—Willian Brinks Olds Hofer Gilson & Lione

[57] ABSTRACT

A microfilm camera for photographing a plurality of originals on a microfilm is disclosed. The improved microfilm camera is provided with a display lamp for indicating that an original is left in a non-photographed state and a buzzer for issuing an alarm on that occasion. If the original non-photographed is left as it is, the display lamp turns on and the buzzer sounds. Accordingly, the original to be photographed is not left in the non-photographed state for a long period.

19 Claims, 8 Drawing Sheets

MICROFILM CAMERA

This application is a continuation, of application Ser. No. 07/318,236, filed Mar. 3, 1989 now abandoned.

BACKGROUND OF THE INVENTION

1. Field of the Invention

The present invention relates to microfilm cameras and particularly to a microfilm camera capable of photographing successively on a microfilm a large number of originals set in a photographing position.

2. Description of the Related Art

In general, a microfilm camera photographs an original when a photographing switch is turned on after the original has been set in a photographing position on a document platen. After an end of photographing of an original, another original is set in the photographing position and thus photographing operation is performed successively.

Such photographing operation involves disadvantages as described below.

It happens that photographing is interrupted after an original has been set. In such a case, it is sometimes unclear whether the set original has been photographed or not after the interruption.

In an electrophotographic copying apparatus or the like, whether the original has been copied or not can be confirmed readily by checking the copy obtained. However, in a conventional microfilm camera, it can be confirmed only after development of the film whether an original has been photographed or not. In addition, the same original is photographed repeatedly by mistake due to uncertain memory of the operator or errors such as failure to photograph an original occur.

Japanese Patent Laying-Open Gazette No. 164730/1982 discloses the following technique.

According to this gazette, a microfilm camera comprises a memory device for successively storing operations of various operation switches, and a switch for reading the contents of this memory device. When it becomes necessary for the operator to confirm whether an original has been photographed or not, the contents of the memory device are successively read out by operation of the reading switch.

However, the technique disclosed in the above indicated gazette involves disadvantages as described below. When the operator desires such confirmation, it is necessary for the operator to operate the reading switch. Thus, any operation by the operator is required. On the other hand, if photographing operation is carried out with no original being set, the fact of turn-on of the photographing switch is recorded. Although it is confirmed by using the reading switch that the photographing operation has been done, it might be erroneously determined by this confirmation that an original has been photographed. Thus, errors in photographing such as failure to photograph an original would occur.

SUMMARY OF THE INVENTION

Therefore, an object of the present invention is to provide a microfilm camera capable of preventing errors photographing such as failure to photograph an original.

Another object of the present invention is to provide a microfilm camera in which no errors in photographing occur even if no particular operation is required for an operator.

Still another object of the present invention is to provide a microfilm camera capable of indicating whether an original set in a photographing position on a platen has been already photographed or not.

A further object of the present invention is to provide a microfilm camera capable of preventing the same original from being photographed repeatedly by mistake.

In order to attain the above described objects, a microfilm camera according to the present invention includes: original placing means for placing an original in a prescribed photographing position; a photographing device for photographing the original on the original placing means onto a microfilm; a detecting device for detecting presence or absence of the original in the photographing position; an input device for issuing an instruction to photograph the original; and a display device for indicating whether the original has been photographed or not, in response to outputs of the detecting device and input device.

Since the microfilm camera is thus constructed, it is indicated whether the original has been photographed or not. Accordingly, the operator can visually confirm whether the original to be photographed has been actually photographed or not. In consequence, the microfilm camera according to the present inveniton makes it possible to prevent errors in photographing such as failure to photograph an original.

According to another aspect of the present invention, a microfilm camera for photographing an original set in a photographing position onto a microfilm includes: a detecting device for detecting presence or absence of the original in the photographing position; an instructing member for instructing photographing of the original on the microfilm; and a display device for indicating information that the original is not photographed, after an elapse of a predetermined time in a state in which the instructing member does not give the photographing instruction after the detection of the presence of the original by the detecting device.

Since the microfilm camera according to the present invention includes the above described elements, the operator can confirm whether the original in the photographing position has been photographed or not, only by looking at the display portion of the microfilm camera. In consequence, errors in photographing do not occur even if the operator does not carry out any particular operation.

According to a further aspect of the present invention, a microfilm camera for photographing an original set in a photographing position onto a microfilm includes: a detecting device for detecting presence or absence of the original in the photographing position; an instructing device for instructing photographing of the original onto the microfilm; and a display device for indicating that the original has been photographed, when the instructing device gives the photographing instruction after the detection of the presence of the original by the detecting device.

Since the microfilm camera is thus constructed, the indication that the original has been photographed is given after the original set in the photographing position has been actually photographed. Accordingly, the same original is not photographed repeatedly by mistake.

According to a preferred embodiment of the invention, the display device gives the indication continuously until the detecting device detects removal of the original from the photographing position. The indication does not disappear unless the operator removes the original from the photographing position. Consequently, the same original is not photographed repeatedly by mistake.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Embodiments of the present invention will be described in detail with reference to the drawings.

Figure 1:
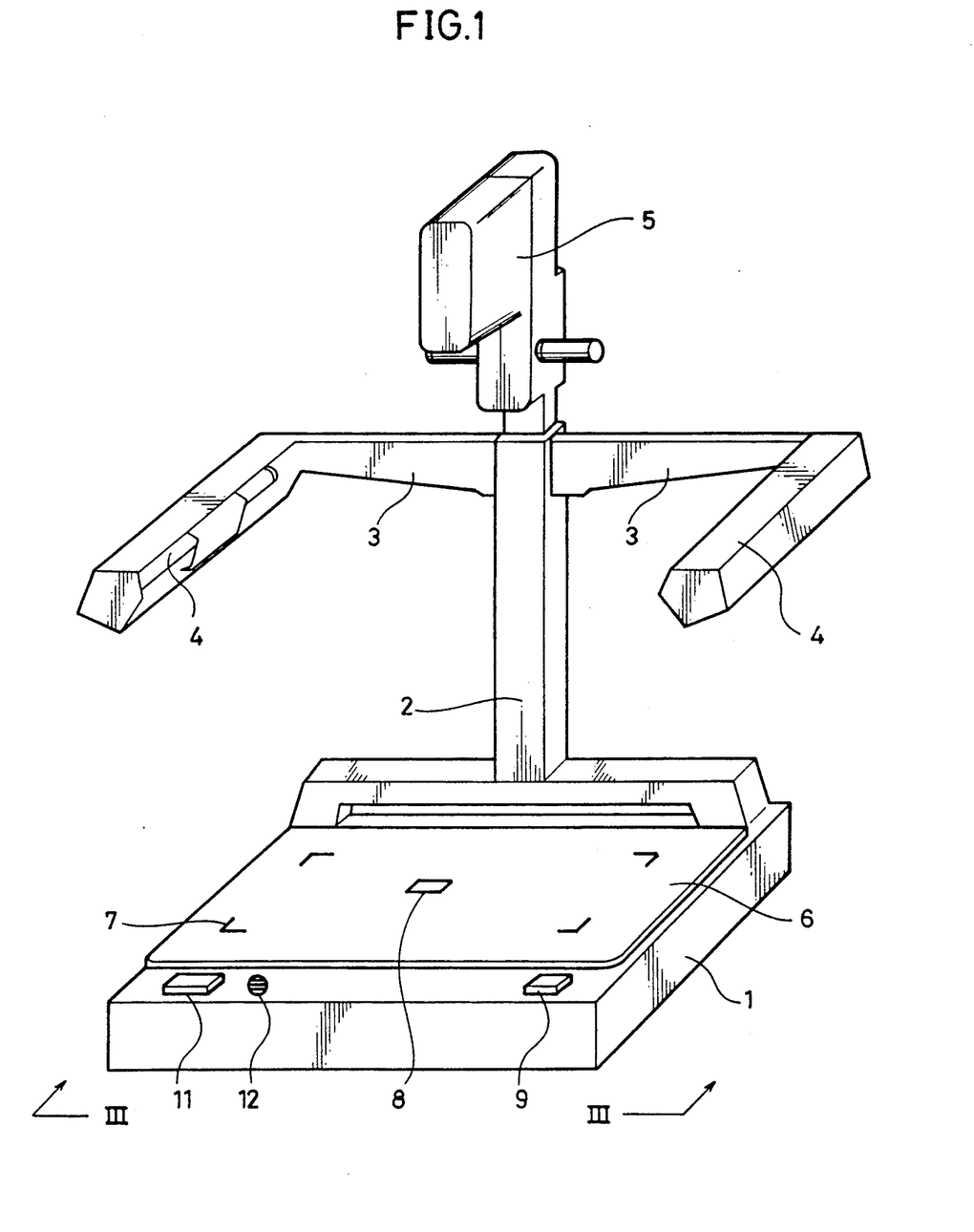
FIG. 1 is a perspective view of a microfilm camera according to the present invention.
Figure 2:
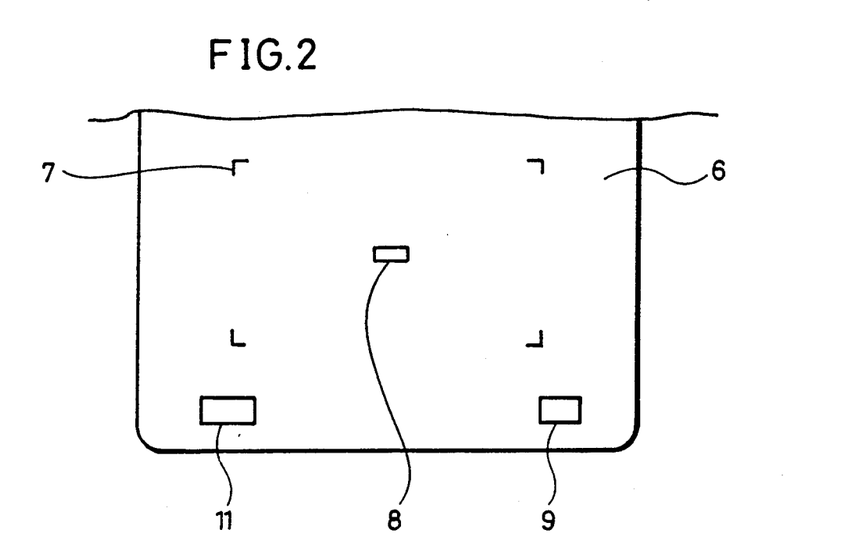
FIG. 2 is a plan view of a document platen.

FIG. 1 is a perspective view showing an appearance of a microfilm camera according to the invention. FIG. 2 is a plan view of the document platen of the camera.

Referring to FIG. 1, the microfilm camera, which is of a manual type, comprises: a base plate 1 for supporting the entire body of the camera, a document platen 6 provided on the base plate 1, on which an original to be photographed is placed, a stay 2 provided at a rear end of the base plate 2, for supporting a camera head 5 and other elements, and an arm 3 fixed to the stay 2, for supporting an illumination unit 4 for illuminating an original to be photographed. The stay 2 can be expanded or retracted vertically. The camera head 5 having the shape of a sealed box comprises a feed reel for feeding a raw film, an exposure portion, a film transport mechanism, a film winding reel etc. (not shown).

The document platen 6 is located under the illumination unit 4 and its surface has marks of corner frames 7. The corner frames 7 indicate a photographing range by means of the camera head 5 and an original (not shown) is set in a photographing position within the corner frames 7.

The illumination unit 4 applies light to the original set in the photographing position. The original is photographed on a microfilm by means of a lens, a shutter, an aperture and the like in the camera head 5. As a result, the original is recorded on the microfilm as a reduced image.

Figure 3A:
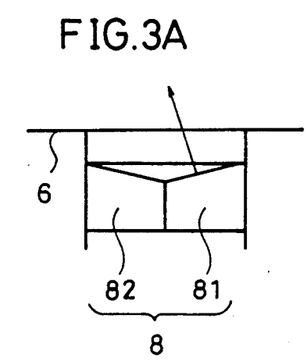
FIGS. 3A and 3B are front views of a detecting device viewed from the side shown by the line III—III in FIG. 1.

A detecting device 8 is provided at the center of the area defined by the corner frames 7 of the platen 6. FIG. 3 shows front views of the detecting device 8 viewed from the side shown by the line III—III in FIG. 1. FIG. 3A represents a state in which no original exists and FIG. 3B represents a state in which an original exists.

As shown in FIG. 3A, if an original S is not set in the photographing position on the platen 6, light from a light emitting portion 81 of the detecting device 8 is diffused upward and it does not enter the light receiving portion 82. As a result, the detecting device 8 is off and it is determined that the original S does not exist.

Figure 3B:
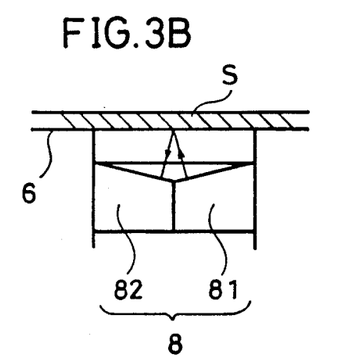

If the original S is set in the photographing position on the platen 6 as shown in FIG. 3B, the light from the light emitting portion 81 of the detecting device 8 is reflected on the back surface of the original S and enters the light receiving portion 82. As a result, the detecting device 8 is turned on and it is determined that the original S exists.

In the above described embodiment, the detecting device 8 is formed by a reflection type photosensor. The detecting device 8 may be formed by other sensors such as an ultrasonic sensor or a limit switch.

The microfilm camera may include a document feeder for automatically feeding the original S to the platen 6. In this case, feeding of the original S to the photographing position and removal of the original S therefrom may be detected in a transport path of the original S, making it possible to detect presence or absence of the original S in the photographing position.

Figure 4:
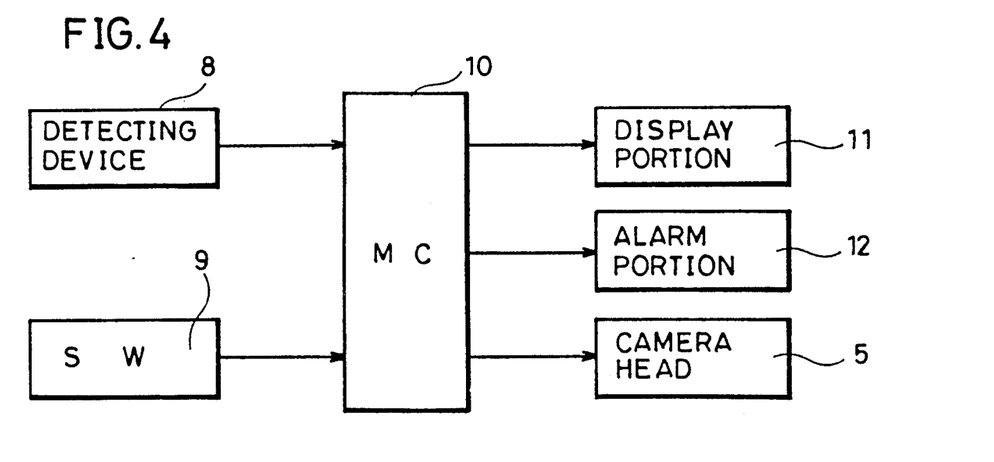
FIG. 4 is a block diagram showing a control system of the microfilm camera.

FIG. 4 is a block diagram showing a control system of the microfilm camera. Referring to FIG. 4, the control system of the microfilm camera comprises a microcomputer 10 as the center of the system, a detecting device 8 for inputting a signal to the microcomputer 10, a photographing switch 9, a camera head 5 for carrying out prescribed operation upon receipt of an output signal from the microcomputer 10, a display portion 11 and an alarm portion 12.

The photographing switch 9 is provided at a front edge of the base plate 1 to instruct photographing of the original S onto the microfilm. When the photographing switch 9 is pressed, an instruction signal is inputted to the microcomputer 10. The microcomputer outputs drive signals to the feeding mechanism, aperture, shutter and other elements of the camera head 5, so that a photographing process is executed.

The display portion 11 and the alarm portion 12 provided at the front edge portion of the base plate 1, for indicating that the original has been photographed or that it is not photographed are responsive to the signals from the microcomputer. The display portion 11 includes a light emitting device such as an LED and it is turned on or off. The alarm portion 12 is turned on to generate an alarm sound. Although both of the display portion 11 and the alarm portion 12 are provided in the first embodiment, only either one of them may be provided.

Figure 5:
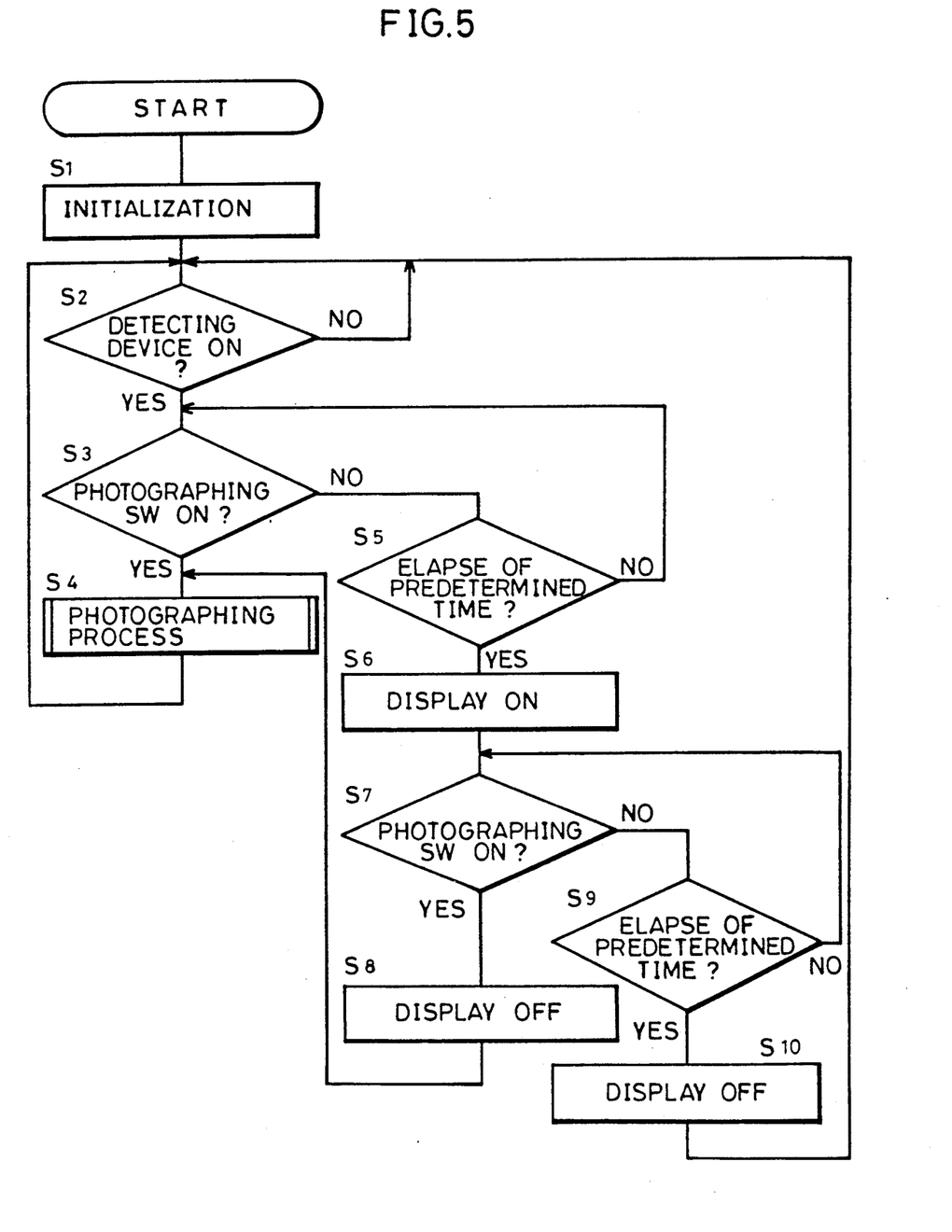
FIG. 5 is a flow chart for controlling a first embodiment of a microfilm camera according to the present invention.

In the following, operation of the microfilm camera of the first embodiment will be described. FIG. 5 is a flow chart showing an example of control.

First, when a power switch (not shown) is turned on, initialization is effected in step S1 in FIG. 5. In step S2, it is determined by the detecting device 8 whether or not the original S is set in the photographing position of the platen 6. When the original S is placed on the platen 6, the detecting device 8 is turned on and the processing flow proceeds to step S3.

In step S3, it is determined whether a photographing instruction is issued by the photographing switch 9. If the operator turns on the photographing switch 9, the processing flow proceeds to step S4 to execute a predetermined photographing process, whereby the original S is photographed as an image on the film. Thereafter, the processing flow returns to step S2.

If the photographing instruction is not given by means of the photographing switch 9 in step S3, it is determined whether a prescribed time has passed after the turn-on of the detecting device 8 (in step S5). If the prescribed time has not passed, the processing flow returns to step S3. If it is determined in step S3 that the prescribed time has passed without issuance of the photographing instruction, a display signal is applied (in step S6). Thus, the display portion 11 is illuminated and the alarm portion 12 begins to generate the alarm sound, thereby indicating information that the original S is not photographed. In consequence, the operator becomes aware that the original S is not photographed.

It is determined again whether the photographing instruction for the original S is issued by means of the photographing switch 9 (in step S7). When the operator finds that the original is not photographed and turns on the photographing switch 9, the application of the display signal stops (in step S8) and thus the display portion 11 is turned off and the alarm portion 12 stops generation of the alarm sound. After that, the photographing process is executed (in step S4).

If the operator does not turn on the photographing switch 9 in step S7 and it is determined that the prescribed time has passed after the turn-on of the display signal (in step S9), the application of the display signal stops, whereby the display portion 11 is turned off and the alarm portion 12 stops generation of the alarm sound (in step S10). Then, the processing flow returns to step S2. If it is determined in the step S9 that the prescribed time has not passed, the flow returns to step S7.

In step S9, it is determined whether or not the prescribed time has passed as described above. In place of such determination, it may be determined whether or not the detecting device 8 is off to check for change of originals S for example.

As described above, according to the first embodiment, if photographing of the original S in the photographing position is not terminated, the display/alarm is a given to indicate that the original is not photographed. Accordingly, it can be easily and readily determined whether the original has been photographed or not, and failure to photograph the original does not occur. As a result, the original can be photographed reliably.

In a very short time before the elapse of the prescribed time, the operator is aware of whether the photographing of the original S is terminated or not and accordingly there is not need to give a display.

Figure 6:
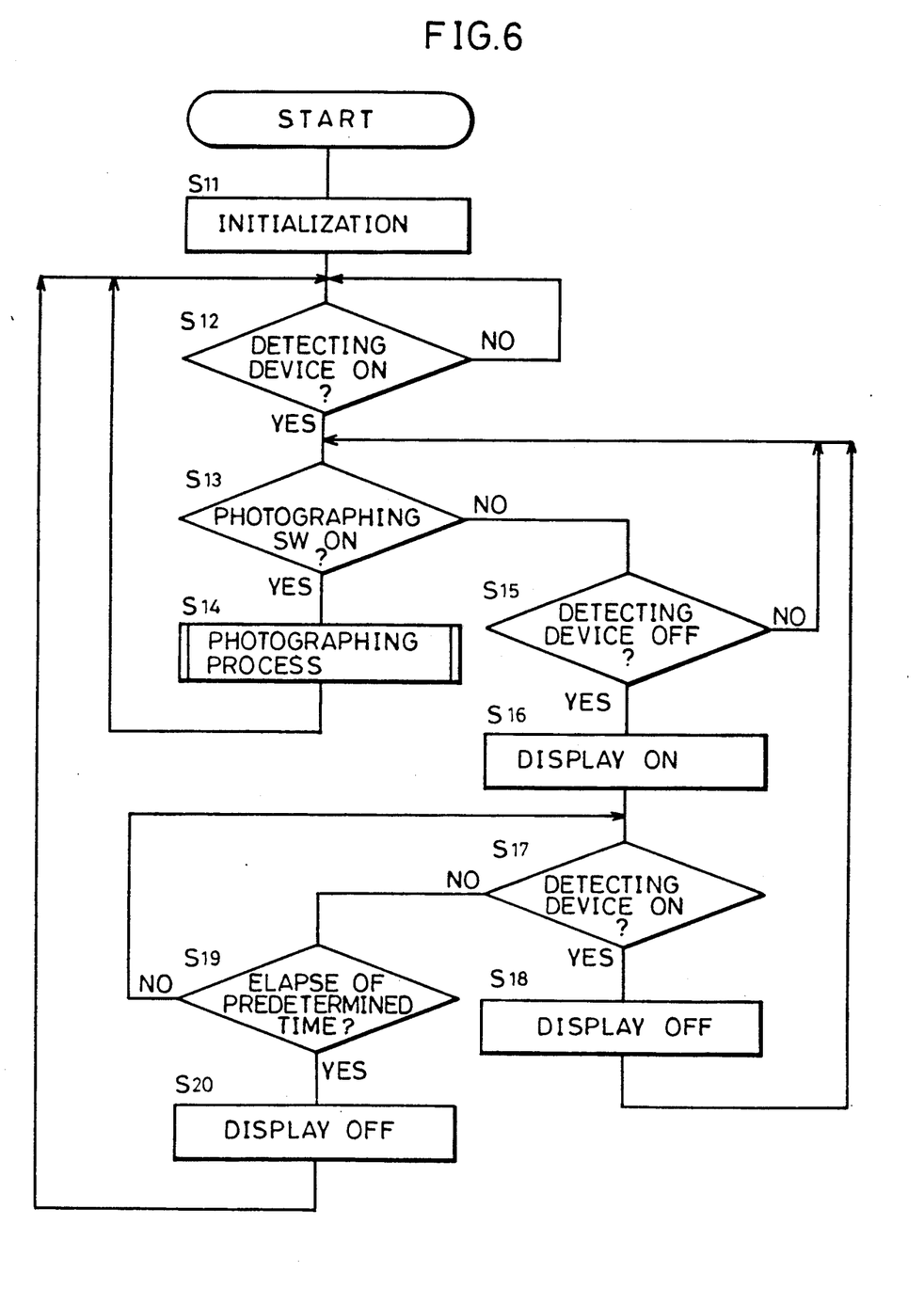
FIG. 6 is a flow chart for controlling of a second embodiment of a microfilm camera according to the present invention.

Next, the second embodiment will be described. Since the construction of the microfilm camera according to the second embodiment is the same as that in the first embodiment and only the control thereof is different, only the different points will be described. FIG. 6 is a flow chart showing the control of the second embodiment. Referring to FIG. 6, operation of the second embodiment will be described.

In the flow of FIG. 6, the procedures from the initialization in step S11 to the photographing process in step 14 are just the same as the procedures from step S1 to step S4 described above in connection with FIG. 5. Therefore, the description thereof is omitted.

If a photographing instruction is not given by means of the photographing switch 9 in step S13 in FIG. 6, it is determined whether or not the original S has been removed from the photographing position of the platen 6 without being photographed (in step S15). If it is not removed, the processing flow returns again to step S13. If the original S has been removed and the detecting device 8 is turned off to determine absence of the original S, the processing flow proceeds to the next step S16.

Then, the display signal is applied. Thus, the display portion 11 is turned on and the alarm portion 12 starts to generate the alarm sound, thereby indicating the information that the removed original S is not photographed.

After that, the processing flow proceeds to step S17 to determine whether the original S is set in the photographing position of the platen 6. More specifically, if the operator finds that the original S is not photographed and places again the original S, causing the detecting device 8 to be turned on again, the processing flow proceeds to step S18 to turn off the display. Thus, the display portion 11 is turned off and the alarm portion 12 stops the generation of the alarm sound. Then, the processing flow returns to step S13 to turn on the photographing switch 9, whereby the photographing process is executed in step S14.

If it is determined in step S17 that the detecting device 8 is not turned on and it is determined in step S19 that a prescribed time has passed thereafter, the display is turned off (in step S20). More specifically, if the operator does not place again the original within the prescribed time, the display portion 11 is turned off and the alarm portion 12 stops the generation of the alarm sound since the photographing of the original is not required. Then, the flow returns to step S12.

If it is determined in step S19 that the prescribed time has not passed, the flow returns to step S17.

Thus, the operator can easily and readily determine according to the above mentioned information whether the original S removed from the photographing position has been photographed or not. In consequence, failure to photograph the original does not occur and photographing operation can be carried out with reliability.

The above described first and second embodiments may be both utilized in combination.

More specifically, the display may be turned on if the prescribed time has passed without turn-on of the photographing switch 9 during a period of detection of presence of the original S by the detecting device 8, or if the detecting device 8 detects absence of the original S with the photographing switch 9 being not turned on after the detecting device 8 detects presence of the original S.

Figure 7:
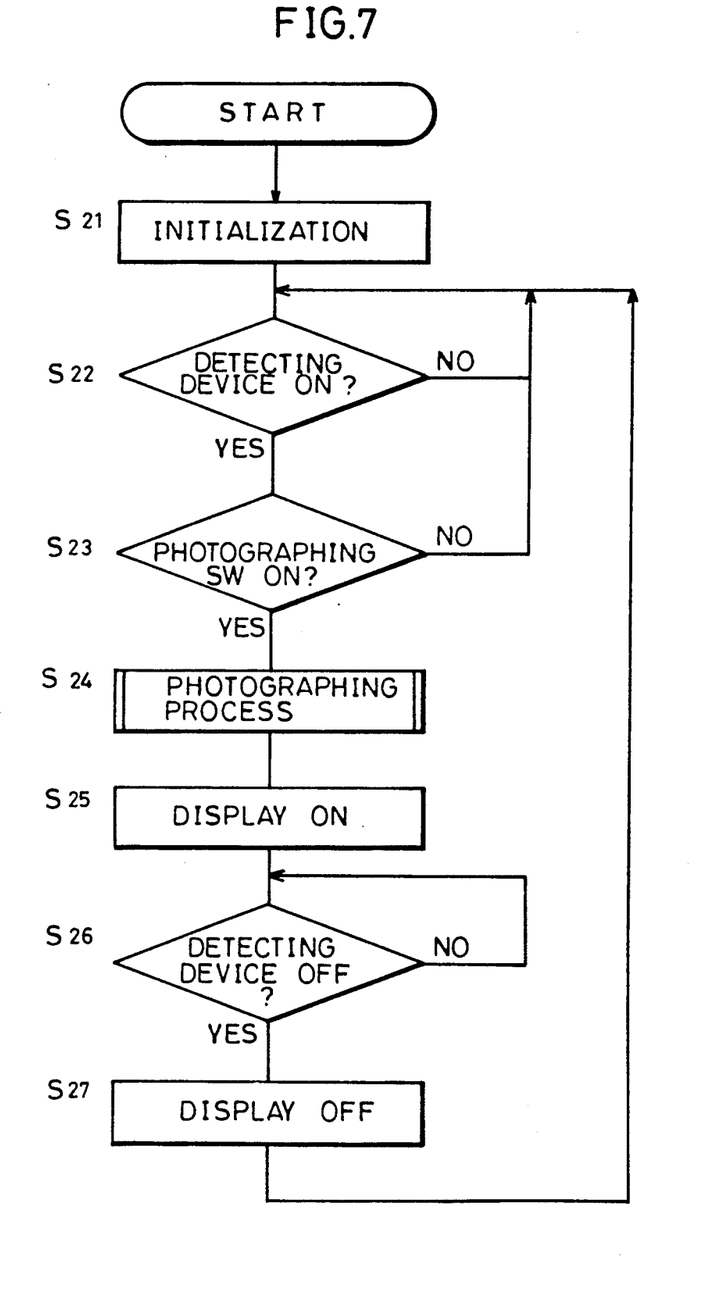
FIG. 7 is a flow chart for controlling a third embodiment of a microfilm camera according to the present invention.

In the following, the third embodiment will be described. The construction of the microfilm camera according to the third embodiment is the same as that of the first embodiment. The third embodiment is different from the first embodiment in the control thereof and the display of information "photographed". Accordingly, only the different points will be described. FIG. 7 is a flow chart showing the control of the microfilm camera according to the third embodiment.

First, when a power switch (now shown) is turned on, initialization is effected in step S21. In step S22, it is determined by the detecting device 8 whether or not the original S is set in the photographing position on the platen 6. When the operator places the original S on the platen 6, the detecting device 8 is turned on, whereby presence of the original S is detected.

Then, in step S23, it is determined whether a photographing instruction is given by means of the photographing switch 9. If the operator does not turn on the photographing switch 9, the processing flow returns to step S22. When the photographing switch 9 is turned on, the processing flow proceeds to the next step.

More specifically, the prescribed processing process is executed, so that the original S is photographed as an image on the film. In step S25, a display signal is applied and thus the display portion 11 in the third embodiment gives the display "photographed".

Thereafter, in step S26, it is determined whether the photographed original S is removed from the photographing position of the platen 6. If the detecting device 8 is turned off to detect absence of the original S, the application of the display signal is stopped and the display portion is turned off (in step S27).

Then, the processing flow returns to step S22.

Thus, determination as to whether the original S has been photographed or not can be easily and readily made only at a glance at the display portion 11 and the photographing operation can be carried out with high reliability.

Next, the fourth embodiment will be described. The construction of the fourth embodiment is the same as that of the first embodiment. However, the fourth embodiment is different from the first embodiment in the procedures of control thereof and the display given for indicating "photographed".

Figure 8:
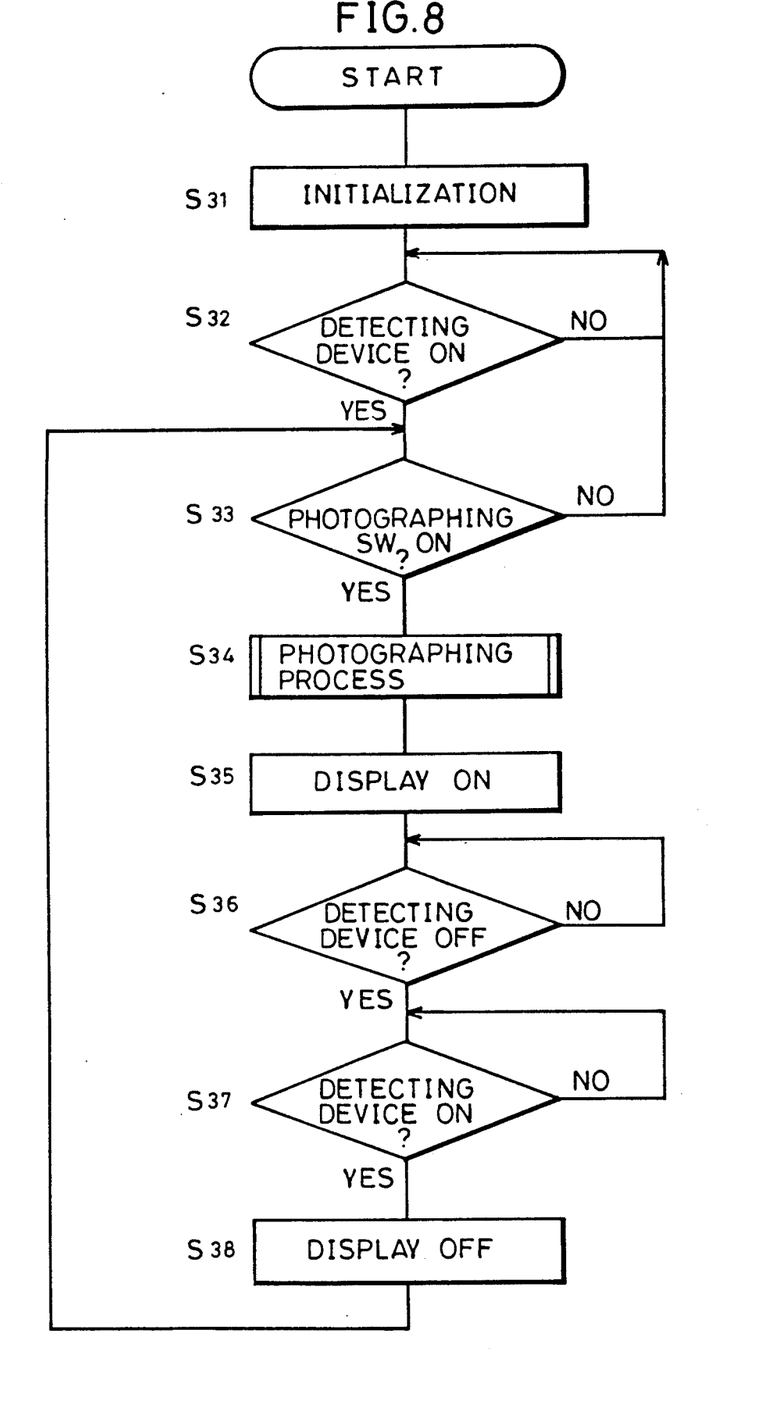
FIG. 8 is a flow chart for controlling a fourth embodiment of a microfilm camera according to the present invention.

FIG. 8 is a flow chart showing the control of the fourth embodiment.

Referring to the flow chart of FIG. 8, the procedures from the initialization in step S31 to the turn-on of the display in step S35 are entirely the same as the procedures from step S21, to step S25 described above in conjunction with FIG. 7 and therefore the description thereof is omitted. In step S36 of FIG. 8, it is determined whether the original S photographed is removed from the photographing position on the platen 6 and if the detecting device 8 is turned off to detect absence of the original S, the processing flow proceeds to the subsequent step S37.

In step S37, it is determined whether another original S is set in the photographing position on the platen 6.

When the operator places the new original S on the platen 6 and the detecting device 8 is turned on again to detect presence of the original S, the processing flow proceeds to the subsequent step S38.

In the subsequent step S38, the application of the display signal is stopped and the display portion 11 is turned off.

Thereafter, the processing flow returns to step S33.

The above described fourth embodiment is particularly advantageous in cases in which, after the photographed S has been removed, the operator is not sure of whether that original S has been photographed or not. The display "photographed" for the removed original S is continuously in the on state until another original S is set. Accordingly, the operator can confirm easily and readily whether the original S has been photographed or not.

In the following, the fifth embodiment will be described. The microfilm camera according to the fifth embodiment has the same construction as that of the first embodiment. It is different from the first embodiment in the procedures of control thereof and the display for the "photographed" original. Therefore, only the different points will be described.

Figure 9:
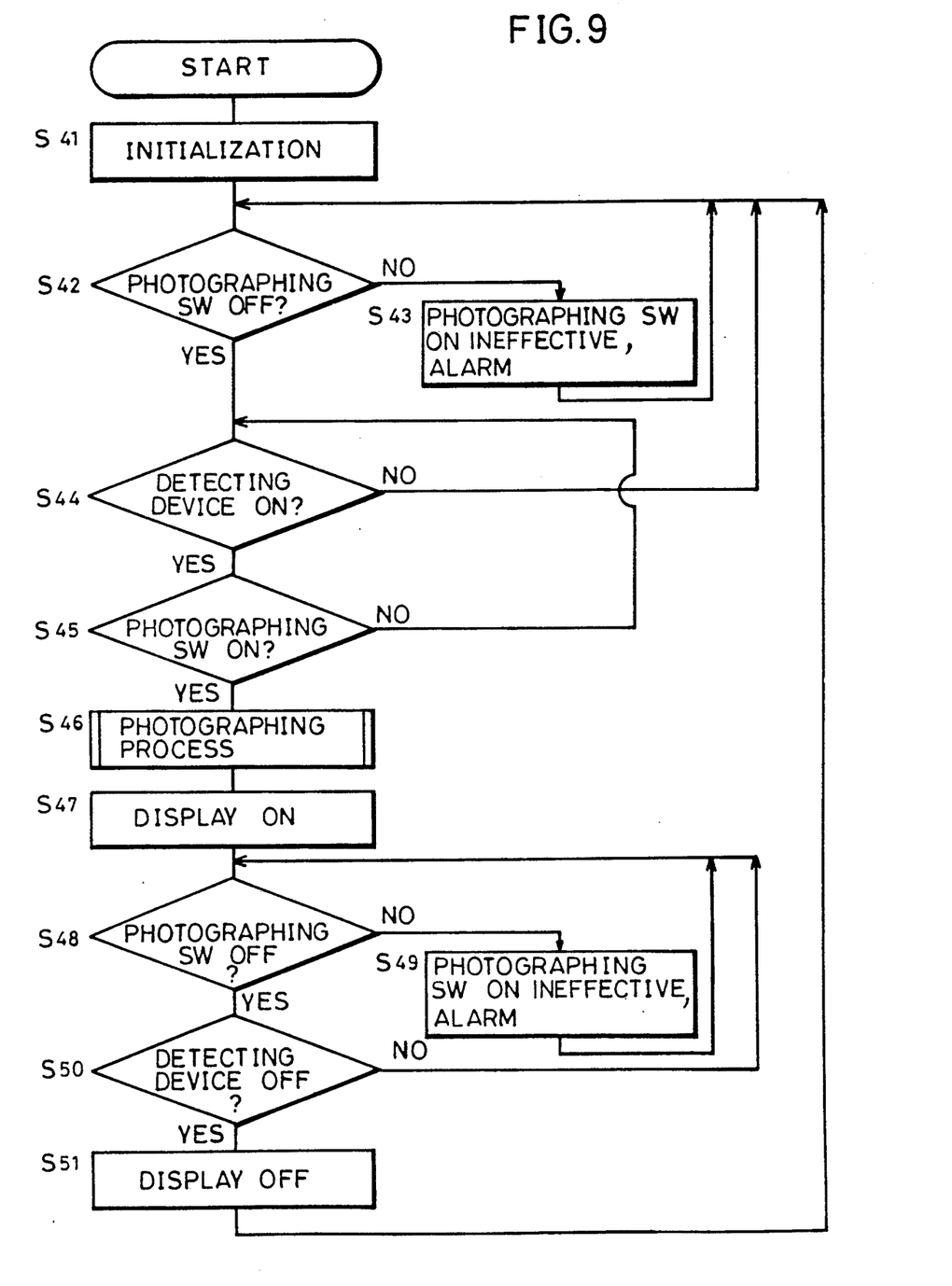
FIG. 9 is a flow chart for controlling a fifth embodiment of a microfilm camera according to the present invention.

FIG. 9 is a flow chart showing the control procedures of the fifth embodiment. Referring to FIG. 9, the control procedures of the fifth embodiment will be described.

First, when a power switch (not shown) is turned on, initialization is effected in step S41.

In step S42, it is determined whether or not a photographing instruction is given by means of the photographing switch 9. If the operator erroneously turns on the photographing switch 9 without setting the original S, the processing flow proceeds to step S43. In step S43, the photographing instruction by this turn-on of the photographing switch 9 is rendered ineffective and the alarm portion 12 gives an alarm sound for a predetermined period. After that, the processing flow returns to step S42.

If it is determined in step S42 that the photographing switch 9 is off, it is determined in the subsequent step S44 by means of the detecting device 8 whether or not the original S is set in the photographing position on the platen 6.

If it is determined that the original S is not set, the flow returns to step S42. However, when the original S is set, the detecting device 8 is turned on to detect the presence of the original S and the processing flow proceeds to the subsequent step S45.

In step S45, it is determined whether or not a photographing instruction is given by means of the photographing switch 9. If the operator does not turn on the photographing switch 9, the processing flow returns to step S44. If the photographing switch is turned on, the processing flow proceeds to the subsequent step S46.

The prescribed photographing process is executed in step S46, whereby the original S is photographed as an image on the film. In step S47, a display signal is applied, whereby the display portion 11 is turned on. As a result, it is announced to the operator that the original S has been photographed.

In the subsequent step S48, it is determined whether or not a photographing instruction is given by means of the photographing switch 9. If the operator erroneously turns on again the photographing switch 9, the processing flow proceeds to step S49. In step S49, the photographing instruction by this turn-on of the photographing switch 9 is rendered ineffective and the alarm portion produces an alarm sound for a predetermined period. Thereafter, the processing flow returns to step S48.

When it is determined in step S48 that the photographing switch 9 is off, it is determined in the subsequent step S50 whether or not the photographed original S has been removed from the photographing position on the platen 6. If the detecting device 8 is on and it is determined that the original S still exists, the flow returns to step S38.

If the detecting device 8 is turned off and absence of the original S is determined, the processing flow in this embodiment proceeds to the subsequent step S51, where the application of the display signal is stopped and the display portion 11 is turned off.

After that, the processing flow returns to step S42. Thus, the operator can easily and readily confirm whether or not the original S has been photographed only by a glance at the display portion 11.

If the operator turns on again the photographing switch 9 by mistake while the display portion 11 gives the display "photographed", that is, until the original S is removed, the following procedures are executed according to this embodiment. The photographing instruction by this turn-on of the switch 9 is rendered ineffective as described above and an alarm is issued in this embodiment. In consequence, repetitive photographing by mistake can be prevented reliably.

Thus, photographing operation can be carried out with high reliability.

Next, the sixth embodiment will be described. The microfilm camera of the sixth embodiment has the same construction as that of the first embodiment. It is different therefrom only in the control procedures thereof and the display for the "photographed" original. Therefore, only the different points will be described.

Figure 10:
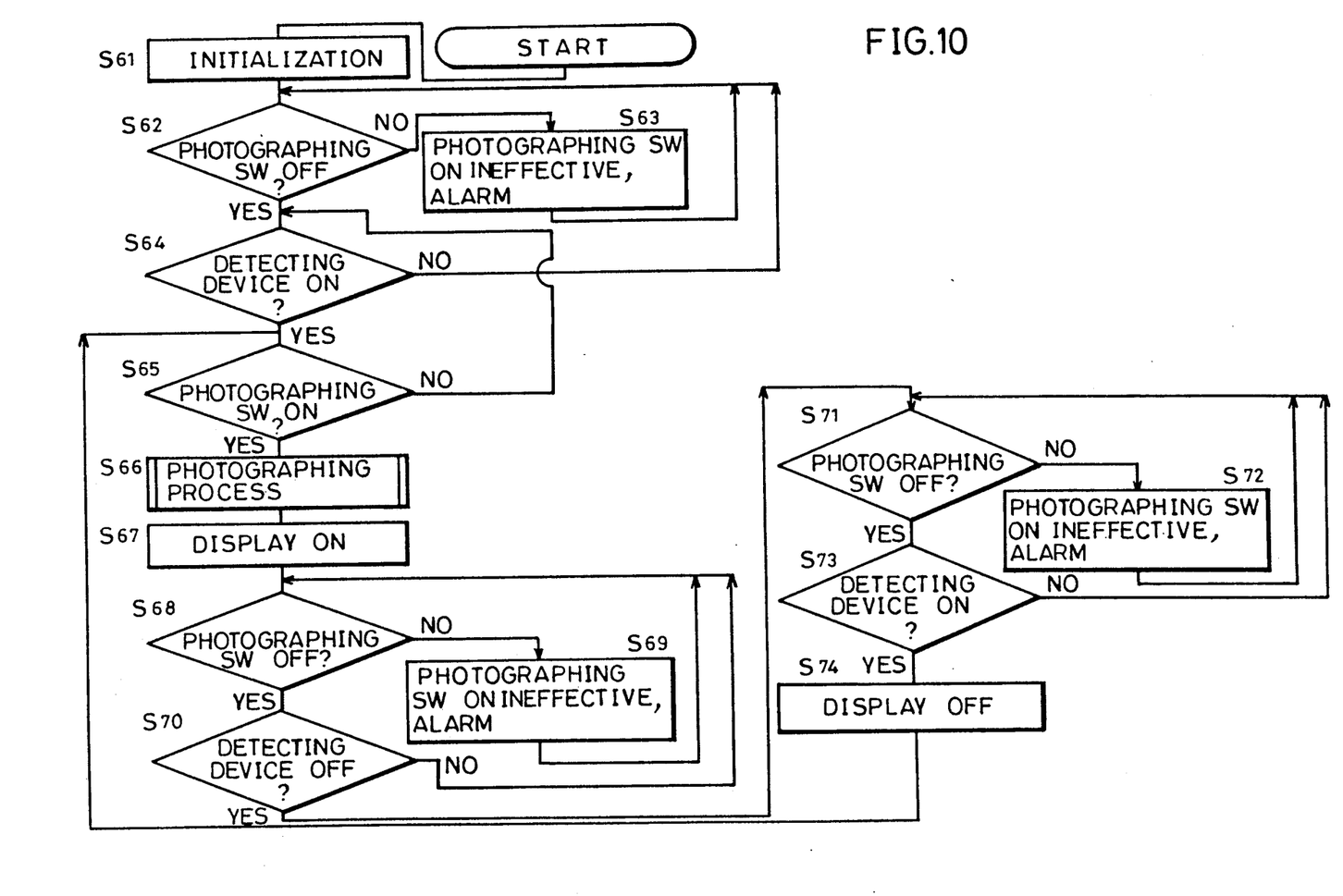
FIG. 10 is a flow chart for controlling a sixth embodiment of a microfilm camera according to the present invention.

FIG. 10 is a flow chart showing the control procedures of the sixth embodiment.

Referring to FIG. 10, the procedures from the initialization of step S61 to step S69 are entirely the same as the procedures from step S41 to step S49 of the fifth embodiment described above in connection with FIG. 9 and therefore the description thereof is omitted.

In step S70 of FIG. 10, it is determined whether the photographed original S has been removed from the photographing position on the platen 6. If the detecting device 8 is still on and the original S is determined to exist, the processing flow returns to step S68.

When the detecting device 8 is turned off and absence of the original S is determined, the processing flow proceeds to the subsequent step S71.

In step S71, it is determined whether or not a photographing instruction is given by means of the photographing switch 9. If the operator turns on again the photographing switch 9 by mistake, the photographing instruction by this turn-on of the switch 9 is rendered ineffective (in step S72) and the alarm portion 12 issues an alarm for a predetermined period. Then, the processing flow returns to step S71.

When it is determined in step S71 that the photographing switch 9 is off, it is determined in the subsequent step S73 whether another new original S is set in the photographing position of the platen 6. When the operator sets the new original S and the detecting device 8 is turned on again to determine presence of the original S, the processing flow proceeds to the subsequent step S74.

In step S74, the application of the display signal is stopped and the display portion 11 is turned off.

The above described sixth embodiment is advantageous in cases in which, after the photographed original S has been removed, the operator is uncertain of whether the photographing switch 9 was turned on for that original S. Thus, the display of "photographed" for the removed original S is continuously in the on state until the next new original S is set. Accordingly, the confirmation as to the turn-on of the photographing switch 9 can be made easily and readily.

If the operator turns on again the photographing switch 9 during the display of "photographed" until another new original is set, the photographing instruction by this turn-on is rendered ineffective as described above and an alarm is issued. Accordingly, repetitive photographing by mistake in such cases can be prevented reliably.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A microfilm camera comprising:
   a document platen on which an original is to be placed in a prescribed photographing position,
   means for photographing the original on said document platen onto a microfilm,
   detecting means for determining whether or not said original is in said photographing position,
   input means for issuing an instruction to photograph said original, and
   display means responsive to outputs of both said detecting means and said input means for indicating whether or not said original has been photographed, said display means having a first displaying condition for indicating that the original has been photographed and a second displaying condition for indicating that the original is not photographed.

2. A microfilm camera in accordance with claim 1, wherein said display means has a plurality of displaying conditions and indicates information on photographing by changing the displaying condition.

3. A microfilm camera in accordance with claim 1, wherein said input means is manually operated.

4. A microfilm camera comprising:
   a document platen on which an original is to be placed in a prescribed photographing position;
   means for photographing the original on said document platen onto a microfilm;
   detecting means for determining whether or not said original is in said photographing position;
   input means for issuing an instruction to photograph said original;
   display means for indicating whether or not said original has been photographed, in response to outputs of said detecting means and said input means; and
   alarm means for issuing an alarm when said original is not photographed.

5. A microfilm camera for photographing an original set in a photographing position onto a film, comprising:
   detecting means for detecting presence or absence of said original in said photographing position,
   instructing means for issuing an instruction to photograph said original onto said film, and
   display means for displaying information that said original is not photographed, after an elapse of a predetermined period with no photographing instruction is given by said instructing means, after the detection of the presence of said original by said detecting means.

6. A microfilm camera for photographing an original set in a photographing position onto a film, comprising:
   detecting means for detecting presence or absence of said original in said photographing position,
   instructing means for issuing an instruction to photograph said original onto said film,
   display means having a displaying condition for indicating that said original is not photographed, and
   means for operating said display means to display said displaying condition when, after the detection of the presence of said original by said detecting means, said detecting means detects the absence of said original with no instruction having been issued by said instructing means after the detection of the presence of said original by said detecting means.

7. A microfilm camera in accordance with claim 6, wherein said display means has a plurality of displaying conditions and indicates information on photographing by changing the displaying condition.

8. A microfilm camera in accordance with claim 6, wherein said instruction means is manually operated.

9. A microfilm camera in accordance with claim 6, wherein said display means has a first displaying condition for indicating that the original has been photographed and a second displaying condition for indicating that the original is not photographed.

10. A microfilm camera for photographing an original set in a photographing position onto a film, comprising:
    detecting means for detecting presence or absence of said original in said photographing position,
    instructing means for issuing an instruction to photograph said original onto said film, and
    display means responsive to outputs of both said instructing means and said detecting means for indicating that said original is photographed, when said instructing means issues said instruction after the detection of the presence of said original by said detecting means, said display means having a first displaying condition for indicating that the original has been photographed and a second displaying condition for indicating that the original is not photographed.

11. A microfilm camera in accordance with claim 10, wherein said display means has a plurality of displaying conditions and indicates information on photographing by changing the displaying condition.

12. A microfilm camera in accordance with claim 11, wherein said instruction means is manually operated.

13. A microfilm camera for photographing an original set in a photographing position onto a film, comprising:
    detecting means for detecting presence or absence of said original in said photographing position;
    instruction means for issuing an instruction to photograph said original onto said film; and
    display means for indicating that said original is photographed, when said instruction means issues said instruction after the detection of the presence of said original by said detecting means, said display means continuously gives said display until said detecting means detects removal of said original from said photographing position.

14. A microfilm camera for photographing on original set in a photographing position onto a film, comprising:
    detecting means for detecting presence or absence of said original in said photographing position;
    instruction means for issuing an instruction to photograph said original onto said film; and
    display means for indicating that said original is photographed, when said instruction means issues said instruction after the detection of the presence of said original by said detecting means, said display means continuously gives said display until said detecting means detects presence of a new original in said photographing position.

15. A microfilm camera for photographing an original set in a photographing position onto a film, comprising:
    detecting means for detecting presence or absence of said original in said photographing position;
    instruction means for issuing an instruction to photograph said original onto said film;
    display means for indicating that said original is photographed, when said instruction means issues said instruction after the detection of the presence of said original by said detecting means; and
    invalidating means for invalidating an input of the photographing instruction in said instruction means when said input is applied during the continuous display by said display means.

16. A microfilm camera in accordance with claim 15, further comprising
    second invalidating means for invalidating an input of the photographing instruction in said instructing means when said input is applied before the detection of the presence of said original by said detecting means.

17. A microfilm camera in accordance with claim 15, further comprising, second invalidating means for invalidating an input of the photographing instruction in said instruction means when said input is applied after the detection of the absence of said original by said detecting means.

18. A microfilm camera for photographing an original set in a photographing position onto a film, comprising:
    detecting means for detecting presence or absence of said original in said photographing position,
    instructing means for issuing an instruction to photograph said original onto said film,
    display means for displaying information that said original is not photographed, when said detecting means detects absence of said original with no instruction being issued by said instructing means after the detection of the presence of said original by said detecting means, and
    alarm means for issuing an alarm when said original is not photographed.

19. A microfilm camera for photographing an original set in a photographing position onto a film, comprising:
    detecting means for detecting presence or absence of said original in said photographing position,
    instructing means for issuing an instruction to photograph said original onto said film,
    display means for indicating that said original is photographed, when said instructing means issues said instruction after the detection of the presence of said original by said detecting means, and
    alarm means for issuing an alarm when said original is not photographed.

* * * * *

UNITED STATES PATENT AND TRADEMARK OFFICE
CERTIFICATE OF CORRECTION

PATENT NO. : 5,051,774

DATED : September 24, 1991

INVENTOR(S) : Hajime Otsuki

It is certified that error appears in the above-identified patent and that said Letters Patent is hereby corrected as shown below:

In col. 1, line 63, before "photographing", insert --in--.
In col. 1, line 63, after "photographing", insert --operations--.
In col. 2, line 26, change "inveniton" to --invention--.
In col. 5, line 60, change "not" to --no--.
In col. 11, line 51 (claim 14, line 1), change "on" to --an--.

Signed and Sealed this

Twenty-third Day of March, 1993

Attest:

STEPHEN G. KUNIN

*Attesting Officer*

Acting Commissioner of Patents and Trademarks